United States Patent
Nallampatti Ekambaram et al.

(10) Patent No.: US 9,445,237 B1
(45) Date of Patent: Sep. 13, 2016

(54) FIRST ARRIVAL PATH BASED MULTIPATH MITIGATION FOR ANGLE OF ARRIVAL ESTIMATION

(71) Applicant: QUALCOMM Incorporated, San Diego, CA (US)

(72) Inventors: Venkatesan Nallampatti Ekambaram, Somerville, NJ (US); Vasuki Narasimha Swamy, Berkeley, CA (US); Jubin Jose, Bound Brook, NJ (US); Xinzhou Wu, Hillsborough, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/644,613

(22) Filed: Mar. 11, 2015

(51) Int. Cl.
    *H04W 4/02* (2009.01)

(52) U.S. Cl.
    CPC .................................. *H04W 4/023* (2013.01)

(58) Field of Classification Search
    CPC ..... H04W 24/02; H04W 4/02; H04B 7/0408
    USPC .................... 455/456.1, 456.3, 456.4, 456.2
    See application file for complete search history.

(56) References Cited

U.S. PATENT DOCUMENTS

| | | | |
|---|---|---|---|
| 3,553,697 A | 1/1971 | Kaufman et al. | |
| 4,150,378 A | 4/1979 | Barton | |
| 6,459,903 B1 | 10/2002 | Lee | |
| 6,892,054 B2 * | 5/2005 | Belcher | G01S 5/0215 342/368 |
| 7,409,227 B2 | 8/2008 | Kobayakawa | |
| 8,548,097 B1 | 10/2013 | Eliaz | |
| 8,619,908 B2 * | 12/2013 | Hoffmann | H04L 27/2613 340/539.13 |
| 8,797,213 B2 | 8/2014 | Pun et al. | |
| 2003/0012265 A1 | 1/2003 | Lin | |
| 2003/0069047 A1 * | 4/2003 | Kitahara | H04B 7/0617 455/562.1 |
| 2004/0048593 A1 | 3/2004 | Sano | |
| 2006/0072524 A1 | 4/2006 | Perahia et al. | |
| 2008/0219099 A1 * | 9/2008 | Novick | G01S 3/8006 367/118 |

FOREIGN PATENT DOCUMENTS

WO      WO-9818018 A1    4/1998

OTHER PUBLICATIONS

Inserra D., et al., "A Frequency-Domain LOS Angle-of-Arrival Estimation Approach in Multipath Channels," IEEE Transactions on Vehicular Technology, 2013, vol. 62 (6), pp. 2812-2818.
International Search Report and Written Opinion—PCT/US2016/017619—ISA/EPO—May 11, 2016.

* cited by examiner

*Primary Examiner* — Qutbuddin Ghulamali
(74) *Attorney, Agent, or Firm* — Paradice and Li LLP

(57) ABSTRACT

A system and method are disclosed that may provide an accurate estimate of the angle of arrival (AoA) of a wireless signal received by a device. The received wireless signal may include a plurality of signal components associated with a number of different arrival paths. The device may generate a weighted signal, including a plurality of weighted signal components, by multiplying the plurality of signal components of the received wireless signal with a set of weighting values. The device may identify one or more of the weighted signal components associated with a first arrival path to the device, determine phase information of the one or more identified weighted signal components, and then determine the angle of arrival based, at least in part, on the determined phase information.

26 Claims, 9 Drawing Sheets

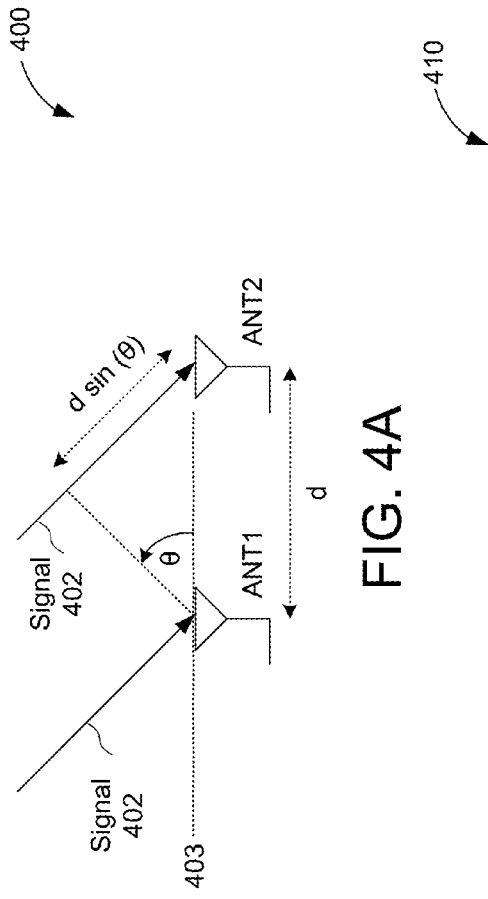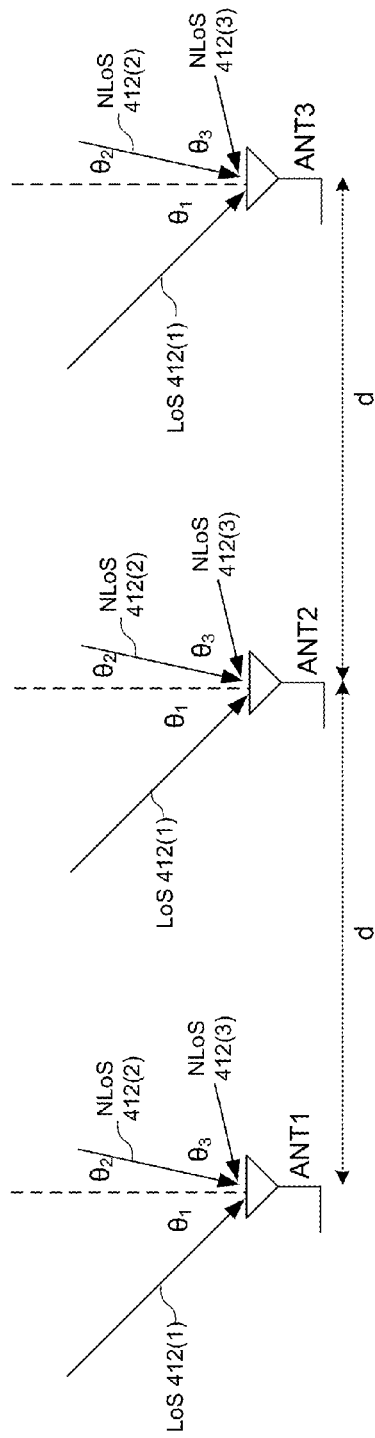
FIG. 4A
FIG. 4B

FIRST ARRIVAL PATH BASED MULTIPATH MITIGATION FOR ANGLE OF ARRIVAL ESTIMATION

TECHNICAL FIELD

The example embodiments relate generally to wireless networks, and specifically to estimating the angle of arrival of signals in wireless networks.

BACKGROUND OF RELATED ART

Angle of arrival (AoA) information for wireless signals transmitted between devices may be estimated and thereafter used to determine the relative position of the devices. For example, if the position of a first mobile station (STA) is known, then the position of a second STA may be determined using AoA information of signals transmitted from the first STA to the second STA. One advantage of using AoA information to determine the position of a STA is that it is a passive technique (e.g., the STA may estimate AoA information without transmitting signals to other devices). Improving the accuracy of estimated AoA information is desirable.

BRIEF DESCRIPTION OF THE DRAWINGS

The example embodiments are illustrated by way of example and are not intended to be limited by the figures of the accompanying drawings, where:

FIG. 4A shows an example reception of a wireless signal at a receiving device.

FIG. 4B shows an example reception of multipath wireless signals at a receiving device.

Like reference numerals refer to corresponding parts throughout the drawing figures.

DETAILED DESCRIPTION

Figure 1:
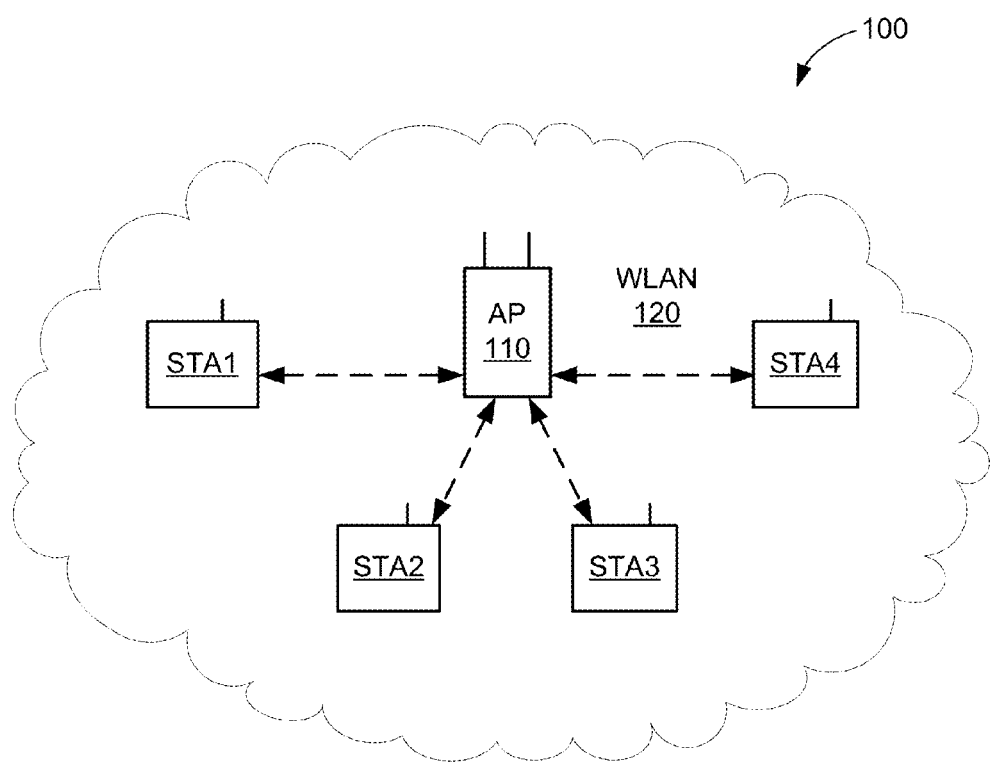
FIG. 1 shows a block diagram of a WLAN system within which the example embodiments may be implemented.

The example embodiments are described below in the context of estimating AoA information in Wi-Fi systems for simplicity only. It is to be understood that the example embodiments are equally applicable to estimating AoA for other wireless networks (e.g., cellular networks, pico networks, femto networks, satellite networks), as well as for systems using signals of one or more wired standards or protocols (e.g., Ethernet and/or HomePlug/PLC standards). As used herein, the terms "WLAN" and "Wi-Fi®" may include communications governed by the IEEE 802.11 family of standards, Bluetooth, HiperLAN (a set of wireless standards, comparable to the IEEE 802.11 standards, used primarily in Europe), and other technologies having relatively short radio propagation range. Thus, the terms "WLAN" and "Wi-Fi" may be used interchangeably herein. In addition, although described below in terms of an infrastructure WLAN system including an AP and a plurality of STAs, the example embodiments are equally applicable to other WLAN systems including, for example, WLANs including a plurality of APs, peer-to-peer (or Independent Basic Service Set) systems, Wi-Fi Direct systems, and/or Hotspots. In addition, although described herein in terms of exchanging data packets between wireless devices, the example embodiments may be applied to the exchange of any data unit, packet, and/or frame between wireless devices. Thus, the term "data packet" may include any frame, packet, or data unit such as, for example, protocol data units (PDUs), MAC protocol data units (MPDUs), and physical layer convergence procedure protocol data units (PPDUs). The term "A-MPDU" may refer to aggregated MPDUs.

In the following description, numerous specific details are set forth such as examples of specific components, circuits, and processes to provide a thorough understanding of the present disclosure. Also, in the following description and for purposes of explanation, specific nomenclature is set forth to provide a thorough understanding of the example embodiments. However, it will be apparent to one skilled in the art that these specific details may not be required to practice the example embodiments. In other instances, well-known circuits and devices are shown in block diagram form to avoid obscuring the present disclosure. The term "coupled" as used herein means connected directly to or connected through one or more intervening components or circuits. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The example embodiments are not to be construed as limited to specific examples described herein but rather to include within their scopes all embodiments defined by the appended claims.

As mentioned above, one device may use AoA information for signals received from another device to determine its position. However, multipath effects may complicate and/or reduce the accuracy of the estimated AoA information. Multipath effects associated with signals transmitted from one device to another device may degrade the accuracy of the estimated AoA information. For example, in some environments, such as indoor and urban environments, a signal transmitted from a first device to a second device may take multiple paths to reach the second device (e.g., due to reflections from physical obstacles between and/or near the two devices), thereby resulting in multiple "copies" or components of the signal arriving at the second device at different times and/or at different angles. The AoA of the signal component associated with the line of sight (LoS) path between the two devices typically provides the most accurate position information, and may therefore be of primary interest; other signal components associated with one or more non line of sight (NLoS) paths may degrade accuracy of the estimated AoA information.

The example embodiments may improve the accuracy of estimated AoA information by identifying one or more received signal components associated with a first arrival path (FAP) to the receiving device, determining a phase of the identified FAP signal components, and then estimating the AoA information based on the determined phase of the identified FAP signal components.

FIG. 1 is a block diagram of an example wireless network system 100 within which the example embodiments may be implemented. The system 100 is shown to include four wireless stations STA1-STA4, a wireless access point (AP) 110, and a wireless local area network (WLAN) 120. The WLAN 120 may be formed by a plurality of Wi-Fi access points (APs) that may operate according to the IEEE 802.11 family of standards (or according to other suitable wireless protocols). Thus, although only one AP 110 is shown in FIG. 1 for simplicity, it is to be understood that WLAN 120 may be formed by any number of access points such as AP 110. The AP 110 is assigned a unique MAC address that is programmed therein by, for example, the manufacturer of the access point. Similarly, each of STA1-STA4 is also assigned a unique MAC address. Although not specifically shown in FIG. 1, for at least some embodiments, the stations STA1-STA4 may exchange signals directly with each other (e.g., without the presence of AP 110).

The stations STA1-STA4 may be any suitable Wi-Fi enabled wireless devices including, for example, cell phones, personal digital assistants (PDAs), tablet devices, laptop computers, or the like. The stations STA1-STA4 may also be referred to as a user equipment (UE), a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. For at least some embodiments, each of stations STA1-STA4 may include a transceiver, one or more processing resources (e.g., processors and/or ASICs), one or more memory resources, and a power source (e.g., a battery). The memory resources may include a non-transitory computer-readable medium (e.g., one or more nonvolatile memory elements, such as EPROM, EEPROM, Flash memory, a hard drive, etc.) that stores instructions for performing operations described below with respect to FIGS. 7A-7B and 8A-8B.

The AP 110 may be any suitable device that allows one or more wireless devices to connect to a network (e.g., a local area network (LAN), wide area network (WAN), metropolitan area network (MAN), and/or the Internet) via AP 110 using Wi-Fi, Bluetooth, or any other suitable wireless communication standards. For at least one embodiment, AP 110 may include a transceiver, a network interface, one or more processing resources, and one or more memory sources. The memory resources may include a non-transitory computer-readable medium (e.g., one or more nonvolatile memory elements, such as EPROM, EEPROM, Flash memory, a hard drive, etc.) that stores instructions for performing operations described operations described above or below with respect to FIGS. 7A-7B and 8A-8B. For other embodiments, one or more functions of AP 110 may be performed by one of stations STA1-STA4.

Figure 2:
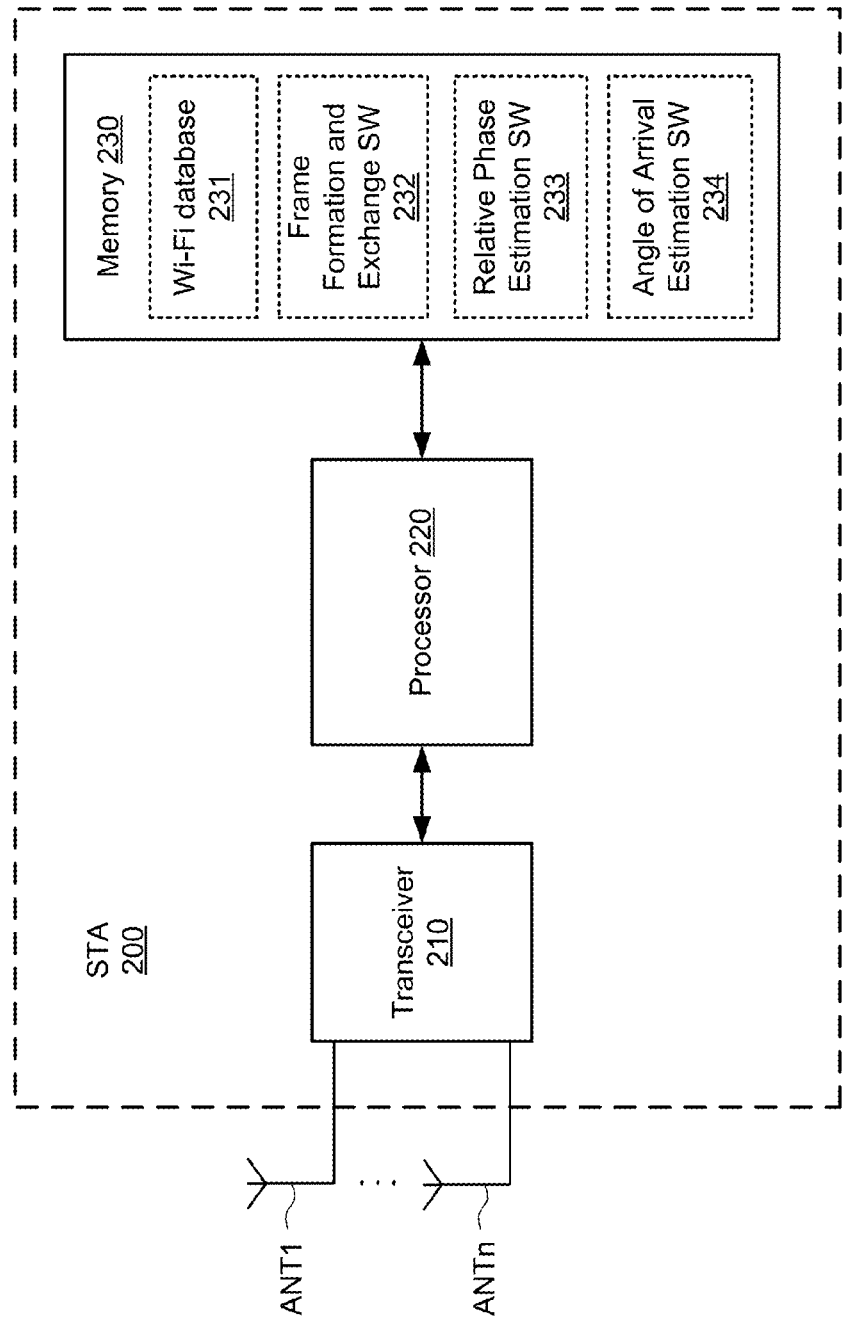
FIG. 2 shows a block diagram of a wireless station (STA) in accordance with some embodiments.

FIG. 2 shows a STA 200 that is one embodiment of at least one of the stations STA1-STA4 of FIG. 1. The STA 200 may include a transceiver 210, at least one processor 220, a memory 230, and a number of antennas ANT1-ANTn. The transceiver 210 may be used to transmit signals to and receive signals from AP 110 and/or other STAs (see also FIG. 1), and may be used to scan the surrounding environment to detect and identify nearby access points (e.g., access points within range of STA 200) and/or nearby STAs. The transceiver 210 is coupled to the antennas ANT1-ANTn and to processor 220. The number of antennas ANT1-ANTn, when greater than one, may be used to provide multiple-input multiple-output (MIMO) functionality and antenna diversity. Antenna diversity may include polarization diversity, pattern diversity, and/or spatial diversity.

For purposes of discussion herein, processor 220 is shown as coupled between transceiver 210 and memory 230. For actual embodiments, transceiver 210, processor 220, and/or memory 230 may be connected together using one or more buses (not shown for simplicity).

Memory 230 may include a Wi-Fi database 231 that may store location data, configuration information, data rates, MAC addresses, timing information, modulation and coding schemes, and other suitable information of a number of access points and/or stations. Memory 230 may also include a non-transitory computer-readable storage medium (e.g., one or more nonvolatile memory elements, such as EPROM, EEPROM, Flash memory, a hard drive, and so on) that may store the following software modules (SW):

- a frame formation and exchange software module 232 to facilitate the creation and exchange of frames (e.g., data frames, ACK frames, request frames, response frames, beacon frames, management frames, association frames, control frames, fine timing measurement (FTM) frames, and so on), for example, as described with respect to FIGS. 7A-7B and 8A-8B;
- a relative phase estimation software module 233 to apply weighting values to one or more components of received signals to estimate the relative phase information of the received signals, for example, as described with respect to FIGS. 7A-7B and 8A-8B; and
- an angle of arrival estimation software module 234 to estimate the AoA of one or more received signal components associated with the first arrival path (FAP) based, at least in part, on the estimated relative phase information, for example, as described with respect to FIGS. 7A-7B and 8A-8B. Each software module includes instructions that, when executed by processor 220, may cause STA 200 to perform the corresponding functions. The non-transitory computer-readable medium of memory 230 thus includes instructions for performing all or a portion of the operations of the method of FIGS. 7A-7B and 8A-8B.

Processor 220, which is coupled to transceiver 210 and memory 230, may be one or more suitable processors capable of executing scripts or instructions of one or more software programs stored in STA 200 (e.g., within memory 230). For example, processor 220 may execute the frame formation and exchange software module 232 to facilitate the creation and/or exchange of various types of frames with one or more other wireless devices. Processor 220 may also execute the relative phase estimation software module 233 to facilitate the weighting of received signals and the estimation of relative phase information. Processor 220 may also execute the angle of arrival estimation software module 234 to facilitate the estimation of the FAP-AoA based, at least in part, on the relative phase information.

Figure 3:
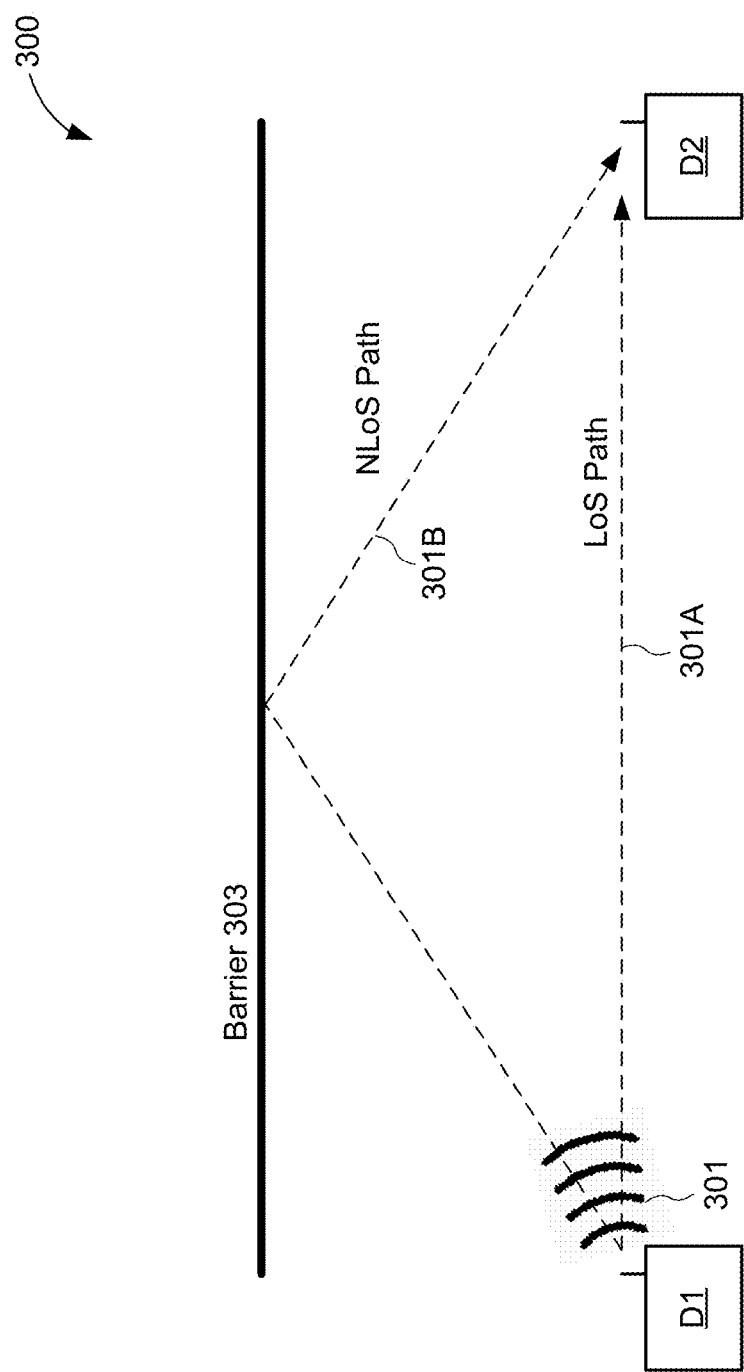
FIG. 3 shows a block diagram of an example wireless signal transmission in the presence of multipath effects.

FIG. 3 is an illustration 300 depicting a simplified example of multipath signal propagation between a first device (D1) and a second device (D2). The devices D1 and D2 may be any suitable wireless devices including, for example, the stations and/or APs shown in FIG. 1. As depicted in FIG. 3, device D1 transmits a signal 301 to device D2. Thus, for purposes of discussion herein, device D1 may be referred to as the transmitting device, and device D2 may be referred to as the receiving device. The signal 301 may be any suitable signal (e.g., one or more packets or frames) from which AoA information may be estimated by device D2.

For the example of FIG. 3, the transmitted signal 301 includes a first signal component 301A and a second signal component 301B. The first signal component 301A travels directly from device D1 to device D2 along a LoS path, and the second signal component 301B travels indirectly from device D1 to device D2 along a NLoS path that reflects off barrier 303 (which may represent any physical obstruction between and/or near devices D1 and D2). As a result, the first signal component 301A and the second signal component 301B may arrive at device D2 at different times and/or at different angles. Because the first signal component 301A travels along a LoS path between devices D1 and D2, AoA information of the first signal component 301A may be used to derive an accurate position of device D2 relative to device D1. Conversely, because the second signal component 301B travels along a NLoS path between devices D1 and D2, AoA information of the second signal component 301B may reduce the accuracy of position determination of device D2 relative to device D1. Thus, when determining the position of device D2 relative to device D1, it may be desirable to use AoA information of the first signal component 301A while ignoring (or at least placing lesser emphasis on) the second signal component 301B.

It is noted that although only one NLoS signal path is depicted in FIG. 3, the transmitted signal 301 may have any number of signal components that travel along any number of NLoS paths between devices D1 and D2. Further, while the first signal component 301A is depicted in FIG. 3 as being received by device D2 without intervening reflections (e.g., such that the AoA of first signal component 301A is substantially the same as the relative positional angle between devices D1 and D2), for many environments the first signal component 301A may be reflected one or more times before reception by device D2.

The devices D1 and D2 may include any number of antennas, for example, as depicted by STA 200 of FIG. 2. Thus, when signal 301 is transmitted from device D1 to device D2, each of its signal components 301A and 301B may be received by different antennas of device D2 at different times due to physical spacing between the antennas. For example, FIG. 4A is an illustration 400 depicting a signal 402 being received by a receiving device having two antennas ANT1 and ANT2 separated by a first distance d (receiving device not shown in FIG. 4A for simplicity). The signal 402 of FIG. 4A may represent any of the signal components 301A-301B of the transmitted signal 301 shown in FIG. 3.

As depicted in FIG. 4A, signal 402 is received at the first and second antennas ANT1 and ANT2 at an angle θ relative to an axis line 403 extending between antennas ANT1 and ANT2. Because the antennas ANT1 and ANT2 are separated by a distance d, the signal 402 as received by second antenna ANT2 travels a distance equal to d sin θ longer than the signal 402 as received by first antenna ANT1.

More generally, let $x(t)$ represent the transmitted signal, let $y_k(t)$ represent the signal received at the $k^{th}$ antenna, and let $\tau_k$ be the arrival time at the $k^{th}$ antenna. Then, assuming that the distance d between the antennas is approximately equal to one-half the wavelength of the transmitted signal, the received signal $y_k(t)$ may be expressed as:

$$y_k(t) = h_1 x\left(t - \tau_1 - \frac{kd}{c}\sin\theta\right) \approx h_1 e^{-j\frac{2\pi f_c kd}{c}\sin\theta} x(t-\tau_1) \approx h_1 e^{-j\pi k \sin\theta} x(t-\tau_1).$$

where c is the speed of light, and $h_1$ is the complex channel gain associated with the first path. Then, the maximum likelihood (ML) estimate of the angle of arrival for a two antenna receiving device (e.g., as depicted in FIG. 4A) may be expressed as:

$$\text{angle}(\Sigma_t y_k^*(t) y_{k-1}(t)) = \pi \sin\theta.$$

A similar expression may be obtained for a receiving device having more than two antennas that receive a multitude of signal components arriving along different paths. For example, FIG. 4B is an illustration 410 depicting a signal 412 having three signal components 412(1)-412(3) being received at three antennas ANT1-ANT3 of a receiving device (receiving device not shown in FIG. 4B for simplicity). For the example illustration 410 of FIG. 4B, the first signal component 412(1) travels along a LoS path to the receiving device, and arrives at ANT1-ANT3 at a first angle $\theta_1$; the second signal component 412(2) travels along one NLoS path to the receiving device, and arrives at ANT1-ANT3 at a second angle $\theta_2$, the third signal component 412(3) travels along another NLoS path to the receiving device, and arrives at ANT1-ANT3 at a third angle $\theta_3$.

It is noted that although only two NLoS signal paths associated with arrival angles $\theta_2$ and $\theta_3$, are depicted in FIG. 4B, the transmitted signal 412 may have any number of signal components that may travel along any number of NLoS paths and arrive at any number of corresponding angles. In addition, although the receiving device is depicted as including three antennas ANT1-ANT3 in the example FIG. 4B, the receiving device may include any number of antennas.

For example, for a device having a number k antennas, the received signal $y_k(t)$ may be expressed (assuming a half-wavelength distance d between the antennas) as:

$$y_k(t) = \sum_i h_i x\left(t - \tau_i - \frac{kd}{c}\sin\theta_i\right) \approx \sum_i h_i e^{-j\pi k \sin\theta_i} x(t-\tau_i).$$

When the receiving device includes a minimum number of antennas, (e.g., when the number of antennas is one more than the number of NLoS signal components), AoA information for all signal components (e.g., arriving along various signal paths) may be estimated using known techniques including, for example, ESPRIT (Estimation of Signal Parameters via Rotational Invariance Techniques) and MUSIC (MUltiple SIgnal Classification). More specifically, a receiving device having a number N of antennas may accurately estimate AoA information for up to a number M of different signal paths using conventional techniques such as ESPRIT and MUSIC, where N≥M+1, However, due to the small form factor of many wireless devices such as smartphones, the number of antennas provided on such wireless devices may be less than the minimum number needed for the above AoA estimation techniques to provide accurate AoA information for multipath signals. Indeed, decreasing the number of antennas provided on a receiving device may reduce the ability of the receiving device to estimate AoA information for signals having multiple paths and angles of arrival. Thus, for example, if a receiving device includes N=3 antennas, then the receiving device may accurately estimate AoA information for up to M=2 different multipath signal components using techniques such as ESPRIT and MUSIC.

An AoA estimation technique is disclosed herein that may overcome the limitations of conventional AoA estimation techniques when a receiving device has a limited number of antennas to receive a signal having a plurality of signal components traveling along a plurality of signal paths. More specifically, the AoA estimate technique disclosed herein may determine an accurate AoA estimate for the signal component that is first to arrive at the receiving device. This signal component may correspond to the first arrival path (FAP) of the received signal, and thus the AoA estimate technique disclosed herein may be referred to as the "FAP-AoA estimation" technique. The FAP-AoA estimation technique disclosed herein may be based, at least in part, on the signal components received along NLoS paths arriving at the receiving device later than the signal component received along the first arrival path.

Figure 5:
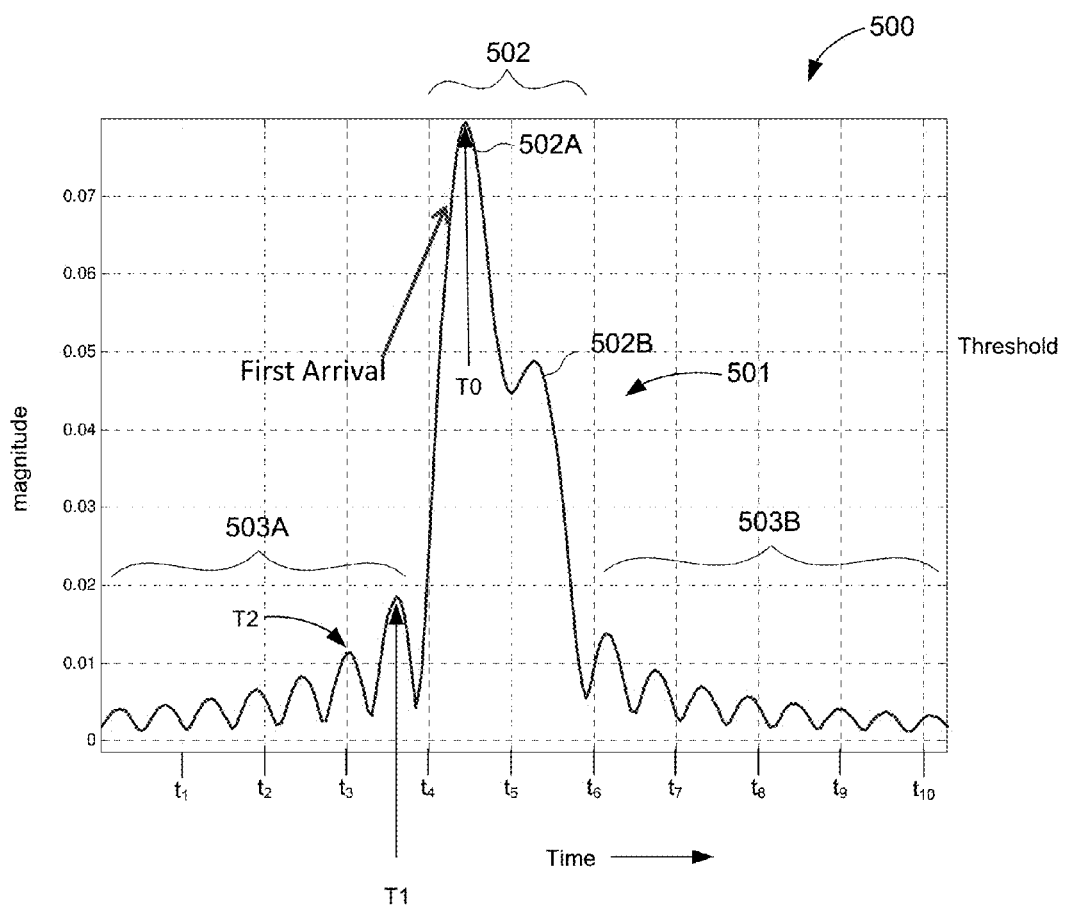
FIG. 5 shows an example spectrum of a received wireless signal.

For example, FIG. 5 shows a spectrum 500 of an example signal 501 received from a transmitting device (not shown in FIG. 5) in the presence of multipath effects. The received signal 501 may be a superposition of multiple sinc pulses, each associated with a corresponding peak or "tap" at a corresponding time value. More specifically, the spectrum 500 includes a main lobe 502 occurring between approximately times $t_4$ and $t_6$, and includes a plurality of secondary lobes 503A and 503B on either side of the main lobe 502. The main lobe 502 includes a first peak 502A and a second peak 502B of different magnitudes (e.g., caused by multipath effects). The first peak 502A, which has a greater magnitude than the second peak 502B, represents the signal components traveling along the first arrival path (FAP) to the receiving device (receiving device not shown in FIG. 5).

Because the NLoS signal components arrive at the receiving device later than the FAP signal components, the first peak 502A and one or more of the secondary lobes 503A on the left side of the main lobe 502 may be less corrupted than the second peak 502B and the secondary lobes 503B on the right side of the main lobe 502. The first peak and the one or more secondary lobes 503A on the left side of the main lobe 502 may be embedded with the phase information of the FAP signal components, and therefore the first peak 502A and zero or more of the secondary lobes 503A may be used to estimate the AoA information of the received signal 501. Accordingly, in accordance with example embodiments, the taps associated with the first peak 502A and the secondary lobes 503A on the left side of the main lobe 502 may be assigned greater weighting values than the taps associated with the second peak 502B and the secondary lobes 503B on the right side of the main lobe 502. This may provide a more accurate estimate of the AoA information of the received signal 501, for example, by placing a greater emphasis on FAP signal components than on other (e.g., non-FAP) signal components.

More specifically, to obtain the phase information of the FAP signal components of the received signal y(t), the signals $y_k(t)$ received at each of a plurality of antennas of the receiving device may be multiplied with a set of weighting values w(t) to generate a weighted receive signal. The weighting values w(t) may be selected to extract the portion of the spectrum 500 containing the FAP information (e.g., the portion of the spectrum 500 on the left side of the main lobe 502). Thus, the extracted portion of the received signal may be expressed as:

$$\tilde{y}_k(t) = w(t) y_k(t)$$

The weighting values w(t) may be set to unity for the first tap corresponding to a spectral magnitude above a threshold, the weighting values w(t) may be set to unity for one or more adjacent taps (to the left of the first tap), and the weighting values w(t) may be set to zero for all other taps. For the example of FIG. 5, the threshold is set to an example magnitude value of 0.05, and the first tap T0 corresponds to the first peak 502A (which is the only tap having a magnitude greater than the threshold); additional taps T1 and T2 are depicted in FIG. 5 as candidate taps for which the corresponding weighting values may be set to unity. Alternatively, the weighting values w(t) may be set to unity for the tap having the largest spectral magnitude, the weighting values w(t) may be set to unity for at least one adjacent tap (to the left of the first tap), and the weighting values w(t) may be set to zero for all other taps. Still further, the weighting values w(t) may be set to unity for all taps having a spectral magnitude above the threshold, and the weighting values w(t) may be set to zero for all other taps.

For other embodiments, the weighting values may be expressed as an exponentially decaying function. For example, let t be the location of the first tap of the received signal spectrum above the threshold. Then, the weighing values may be expressed as:

$$w(t) = e^{-\eta_1(\tau - t)} \text{ for } t \leq \tau$$

$$w(t) = e^{-\eta_2(t - \tau)}, \text{ for } t > \tau,$$

where and $\eta_1$ and $\eta_2$ may be parameters selected, for example, by a user of the receiving device. For still other embodiments, the weighting values w(t) may be a function of the channel response (e.g., an impulse time response) observed by the receiving device.

Next, the phase information may be determined from the signal $\tilde{y}_k(t)$ using a parametric algorithm. For at least some embodiments, known AoA estimation techniques such as MUSIC or ESPRIT may be used as the parametric algorithm. For embodiments in which the receiving device includes two or more antennas, the phase information may be extracted from the weighted signal $\tilde{y}_k(t)$ using the best ML estimate, as described above.

Then, the AoA of the FAP signal components, denoted herein as φ, may be estimated based on the determined phase information of the weighted signal $\tilde{y}_k(t)$. For relatively simple environments (e.g., associated with less complex multipath effects and thus a relatively small number of NLoS signal components), the relationship φ=π sin θ may provide an acceptable first order approximation of FAP AoA information.

For relatively complex environments (e.g., associated with more complex multipath effects and thus a relatively large number of NLoS signal components), multiple phase estimates may be derived from the signal $\tilde{y}_k(t)$ using the parametric algorithm and then a higher-order estimation function may be used to select the correct phase from the derived multiple phase estimates. For some embodiments, the higher-order estimation function for φ may be expressed as:

$$\phi = \Sigma_i \alpha_i \sin(\theta + \beta_i) + \gamma_i.$$

This higher-order estimation function may be used to derive a relationship between θ and φ. For example, the following relationship between θ and φ may be used:

$$f(\phi,\theta) = |e^{j\phi} - e^{j(\alpha_1 \sin(\theta+\beta_1)+\gamma_1+\alpha_2 \sin(3\theta+\beta_2)+\gamma_2)}|$$

For such embodiments, the FAP angle φ may be estimated by first estimating all local minima of the function $f(\phi,\theta)$. Note that $\alpha_i$, $\beta_i$, and $\gamma_i$ are parameters determined algorithmically by fitting the minima of $f(\phi,\theta)$ to the FAP angle φ. The relative phase θ may range from 0 to 360 degrees (or from 0 to 2π radians).

For some environments, there may be multiple minima of the function $f(\phi,\theta)$. When there are multiple minima of the function $f(\phi,\theta)$, the correct FAP angle φ may be determined by using a tracking function that selects the minimum closest to the true angle (e.g., closest to the first order approximation $\phi = \pi \sin \theta$ or another rough approximation of the FAP angle).

Figure 6:
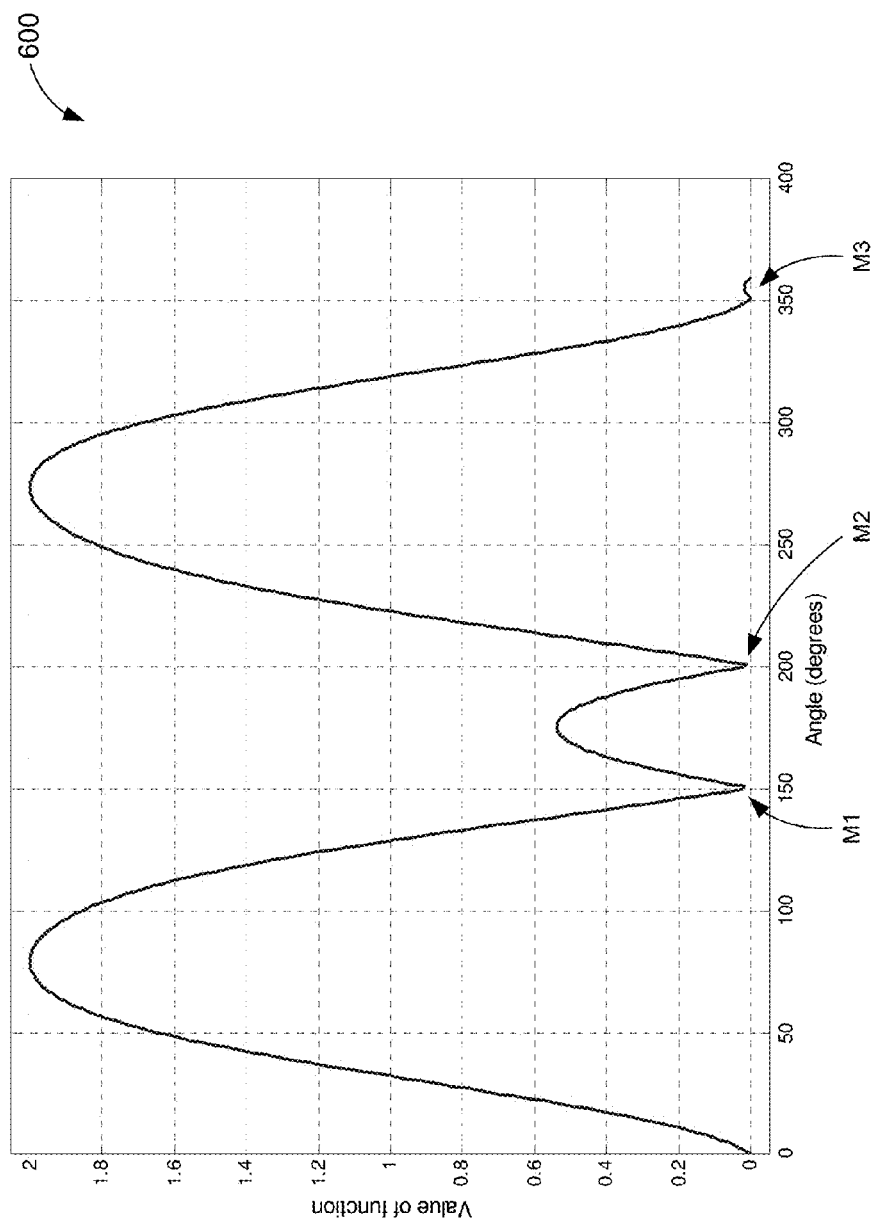
FIG. 6 depicts an example graph of an Angle of Arrival (AoA) estimation function, in accordance with some embodiments.

FIG. 6 depicts an example plot 600 of the function $f(\phi,\theta)$, in accordance with some embodiments. The example plot 600 includes minima M1, M2, and M3 at approximately 150 degrees, at approximately 200 degrees, and at approximately 350 degrees, respectively. Because a rough approximation of the FAP angle is known, any suitable tracking function may be used to select the local minimum closest to the approximation.

Figure 7A:
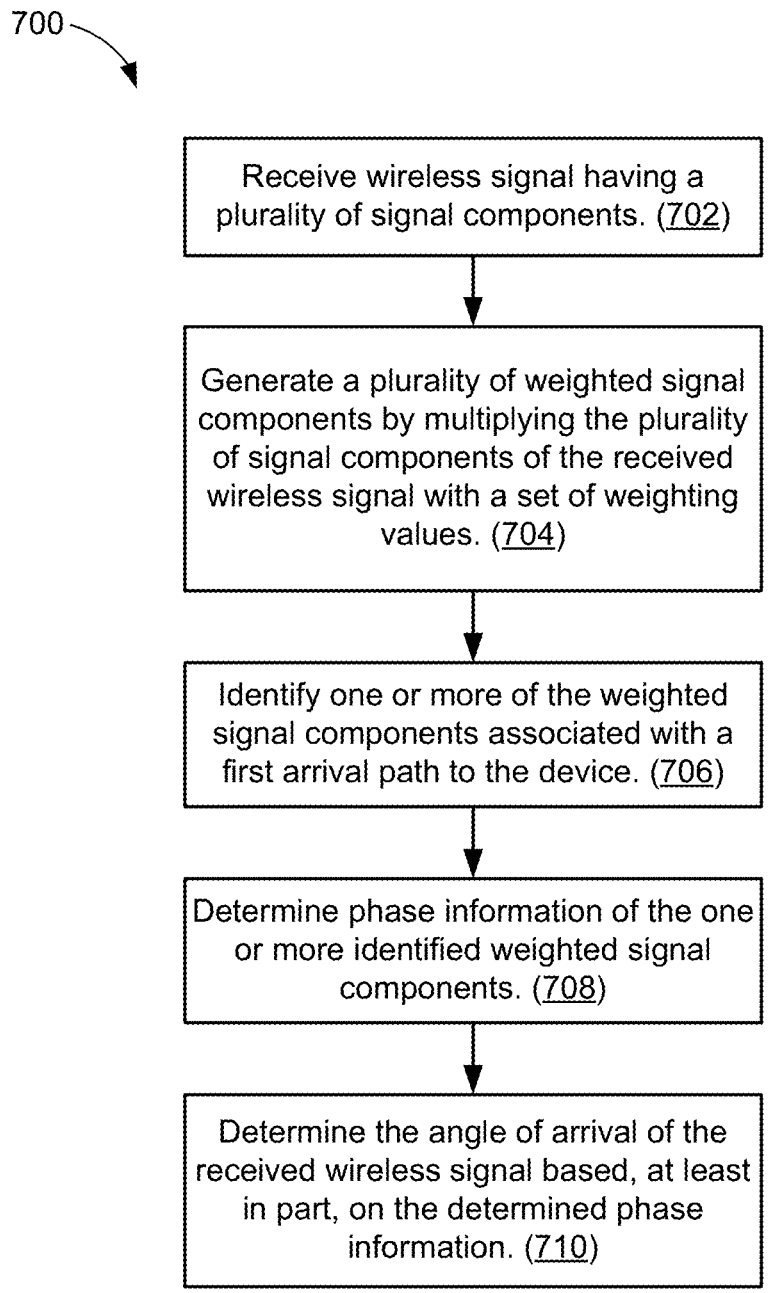
FIG. 7A shows an illustrative flow chart depicting example operations for estimating an AoA of received signals in accordance with some embodiments.

FIG. 7A is a flow chart depicting an example operation 700 for determining the AoA of a wireless signal received by a receiving device. First, the receiving device may receive a wireless signal including a plurality of signal components (702). As described above, the plurality of signal components may arrive at the receiving device along a number of different arrival paths. Then, the receiving device may generate a plurality of weighted signal components by multiplying the plurality of signal components of the received wireless signal with a set of weighting values (704). The plurality of weighted signal components may be combined to construct a weighted signal.

The receiving device may identify one or more of the weighted signal components associated with a first arrival path to the device (706), and then may determine phase information of the one or more identified weighted signal components (708). The receiving device may determine the angle of arrival of the received wireless signal based, at least in part, on the determined phase information (710).

Figure 7B:
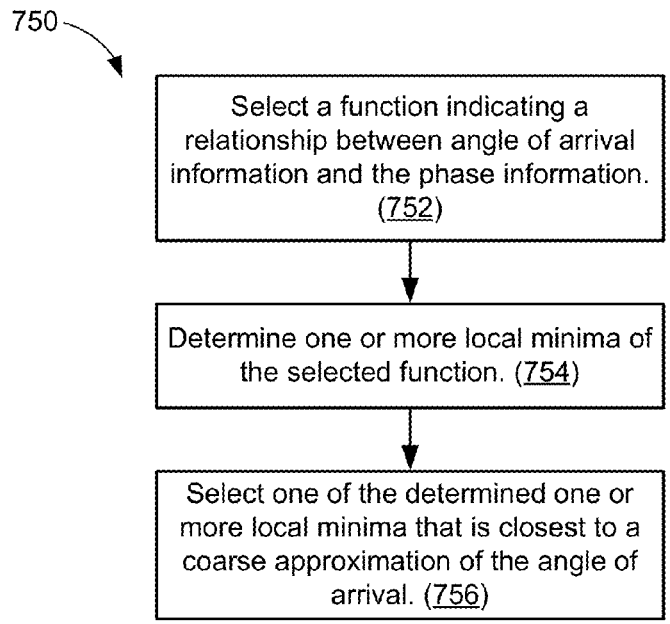
FIG. 7B shows an illustrative flow chart depicting example operations for determining the angle of arrival.

FIG. 7B is a flow chart depicting an example operation 750 for determining the angle of arrival by a receiving device. First, the receiving device may select a function indicating a relationship between angle of arrival information and the phase information (752). The receiving device may then determine one or more local minima of the selected function (754). The receiving device may then select one of the determined one or more local minima that is closest to a coarse approximation of the angle of arrival (756).

Figure 8A:
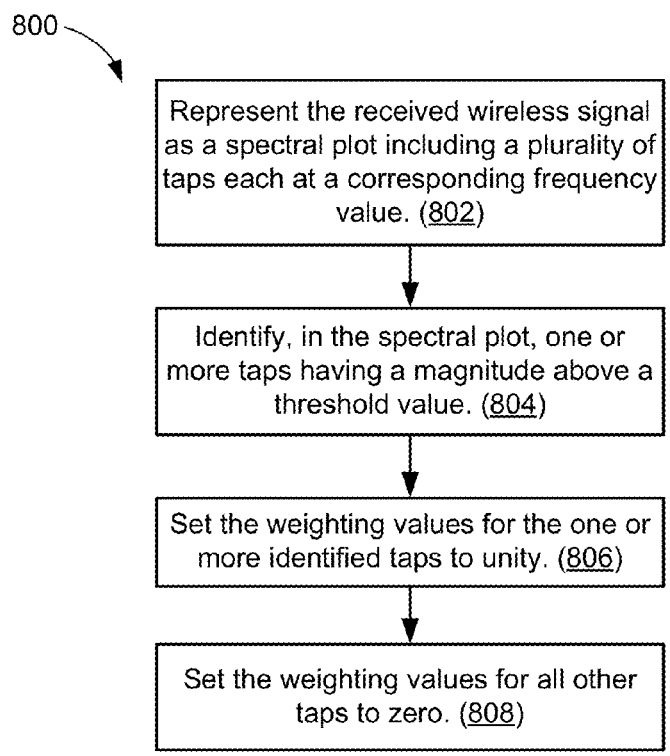
FIG. 8A shows an illustrative flow chart depicting one example operations for setting weighting values of the operation of FIG. 7A.

FIG. 8A is a flow chart depicting one example operation 800 for setting the weighting values. First, the receiving device may represent the received wireless signal as a spectral plot including a plurality of taps each at a corresponding time value (802). The receiving device may identify, in the spectral plot, one or more taps having a magnitude above a threshold value (804). The receiving device may set the weighting values for the one or more identified taps to unity (806). Then, the receiving device may set the weighting values for all other taps to zero (808).

Figure 8B:
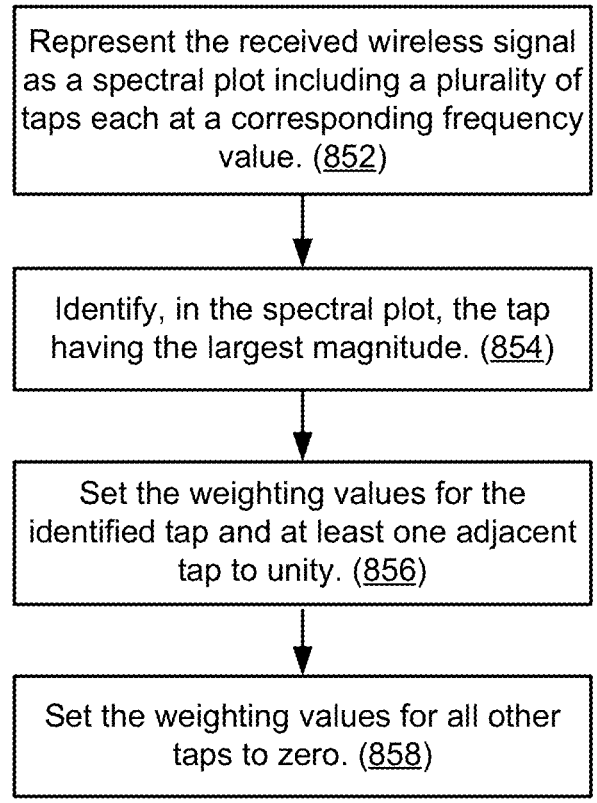
FIG. 8B shows an illustrative flow chart depicting another example operations for setting weighting values of the operation of FIG. 7A.

FIG. 8B is a flow chart depicting another example operation 850 for setting the weighting values. First, the receiving device may represent the received wireless signal as a spectral plot including a plurality of taps each at a corresponding time value (852). The receiving device may identify, in the spectral plot, the tap having the largest magnitude (or having a magnitude above a threshold value (854). The receiving device may set the weighting values for the identified tap and at least one adjacent tap to unity (856). Then, the receiving device may set the weighting values for all other taps to zero (858).

In the foregoing specification, the example embodiments have been described with reference to specific example embodiments thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method of estimating an angle of arrival of a wireless signal received at a device, the received wireless signal including a plurality of signal components associated with a number of different arrival paths, the method comprising:
   generating a plurality of weighted signal components by multiplying the plurality of signal components of the received wireless signal with a set of weighting values;
   identifying one or more of the weighted signal components associated with a first arrival path to the device;
   determining phase information of the one or more identified weighted signal components; and
   determining the angle of arrival of the received wireless signal based, at least in part, on the determined phase information by:
      selecting a function indicating a relationship between angle of arrival information and the phase information;
      determining one or more local minima of the selected function; and
      selecting one of the determined one or more local minima that is closest to a coarse approximation of the angle of arrival.

2. The method of claim 1, further comprising:
   representing the received wireless signal as a spectral plot including a plurality of taps each at a corresponding time value;
   identifying, in the spectral plot, one or more taps having a magnitude above a threshold value;
   setting the weighting values for the one or more identified taps to unity; and
   setting the weighting values for all other taps to zero.

3. The method of claim 1, further comprising:
   representing the received wireless signal as a spectral plot including a plurality of taps each at a corresponding time value;
   identifying, in the spectral plot, the tap having the largest magnitude;
   setting the weighting values for the identified tap and at least one adjacent tap to unity; and
   setting the weighting values for all other taps to zero.

4. The method of claim 1, wherein the set of weighting values comprises an exponentially decaying function.

5. The method of claim 1, wherein the set of weighting values is based on an impulse time response of a wireless channel associated with receiving the wireless signal.

6. The method of claim 1, wherein the phase information of the one or more identified weighted signal components is determined by applying a parametric algorithm to the plurality of weighted signal components.

7. The method of claim 6, further comprising:
generating a plurality of phase estimates in response to application of the parametric algorithm to the plurality of weighted signal components; and
selecting the one of the plurality of phase estimates associated with the first arrival path.

8. A wireless device for estimating an angle of arrival of a received wireless signal, the received wireless signal including a plurality of signal components associated with a number of different arrival paths, the wireless device comprising:
one or more processors; and
a memory storing one or more programs comprising instructions that, when executed by the one or more processors, cause the wireless device to perform operations comprising:
generating a plurality of weighted signal components by multiplying the plurality of signal components of the received wireless signal with a set of weighting values;
identifying one or more of the weighted signal components associated with a first arrival path to the device;
determining phase information of the one or more identified weighted signal components; and
determining the angle of arrival of the received wireless signal based, at least in part, on the determined phase information by:
selecting a function indicating a relationship between angle of arrival information and the phase information;
determining one or more local minima of the selected function; and
selecting one of the determined one or more local minima that is closest to a coarse approximation of the angle of arrival.

9. The wireless device of claim 8, wherein execution of the instructions by the one or more processors causes the wireless device to perform operations further comprising:
representing the received wireless signal as a spectral plot including a plurality of taps each at a corresponding time value;
identifying, in the spectral plot, one or more taps having a magnitude above a threshold value;
setting the weighting values for the one or more identified taps to unity; and
setting the weighting values for all other taps to zero.

10. The wireless device of claim 8, wherein execution of the instructions by the one or more processors causes the wireless device to perform operations further comprising:
representing the received wireless signal as a spectral plot including a plurality of taps each at a corresponding time value;
identifying, in the spectral plot, the tap having the largest magnitude;
setting the weighting values for the identified tap and at least one adjacent tap to unity; and
setting the weighting values for all other taps to zero.

11. The wireless device of claim 8, wherein the set of weighting values comprises an exponentially decaying function.

12. The wireless device of claim 8, wherein the set of weighting values is based on an impulse time response of a wireless channel associated with receiving the wireless signal.

13. The wireless device of claim 8, wherein the phase information of the one or more identified weighted signal components is determined by applying a parametric algorithm to the plurality of weighted signal components.

14. The wireless device of claim 13, wherein execution of the instructions by the one or more processors causes the wireless device to perform operations further comprising:
generating a plurality of phase estimates in response to application of the parametric algorithm to the plurality of weighted signal components; and
selecting the one of the plurality of phase estimates associated with the first arrival path.

15. A non-transitory computer-readable storage medium storing one or more programs containing instructions that, when executed by one or more processors of a wireless device, cause the wireless device to estimate an angle of arrival of a received wireless signal, including a plurality of signal components associated with a number of different arrival paths, by performing operations comprising:
generating a plurality of weighted signal components by multiplying the plurality of signal components of the received wireless signal with a set of weighting values;
identifying one or more of the weighted signal components associated with a first arrival path to the device;
determining phase information of the one or more identified weighted signal components; and
determining the angle of arrival of the received wireless signal based, at least in part, on the determined phase information by:
selecting a function indicating a relationship between angle of arrival information and the phase information;
determining one or more local minima of the selected function; and
selecting one of the determined one or more local minima that is closest to a coarse approximation of the angle of arrival.

16. The non-transitory computer-readable storage medium of claim 15, wherein execution of the instructions by the one or more processors causes the wireless device to perform operations further comprising:
representing the received wireless signal as a spectral plot including a plurality of taps each at a corresponding time value;
identifying, in the spectral plot, one or more taps having a magnitude above a threshold value;
setting the weighting values for the one or more identified taps to unity; and
setting the weighting values for all other taps to zero.

17. The non-transitory computer-readable storage medium of claim 15, wherein execution of the instructions by the one or more processors causes the wireless device to perform operations further comprising:
representing the received wireless signal as a spectral plot including a plurality of taps each at a corresponding time value;
identifying, in the spectral plot, the tap having the largest magnitude;
setting the weighting values for the identified tap and at least one adjacent tap to unity; and
setting the weighting values for all other taps to zero.

18. The non-transitory computer-readable storage medium of claim 15, wherein the set of weighting values comprises an exponentially decaying function.

19. The non-transitory computer-readable storage medium of claim 15, wherein the set of weighting values is based on an impulse time response of a wireless channel associated with receiving the wireless signal.

20. The non-transitory computer-readable storage medium of claim 15, wherein the phase information of the one or more identified weighted signal components is determined by applying a parametric algorithm to the plurality of weighted signal components.

21. The non-transitory computer-readable storage medium of claim 20, wherein execution of the instructions by the one or more processors causes the wireless device to perform operations further comprising:
generating a plurality of phase estimates in response to application of the parametric algorithm to the plurality of weighted signal components; and
selecting the one of the plurality of phase estimates associated with the first arrival path.

22. A wireless device for estimating an angle of arrival of a received wireless signal, the received wireless signal including a plurality of signal components associated with a number of different arrival paths, the wireless device comprising:
means for generating a plurality of weighted signal components by multiplying the plurality of signal components of the received wireless signal with a set of weighting values;
means for identifying one or more of the weighted signal components associated with a first arrival path to the device;
means for determining phase information of the one or more identified weighted signal components; and
means for determining the angle of arrival of the received wireless signal based, at least in part, on the determined phase information by:
selecting a function indicating a relationship between angle of arrival information and the phase information;
determining one or more local minima of the selected function; and
selecting one of the determined one or more local minima that is closest to a coarse approximation of the angle of arrival.

23. The wireless device of claim 22, further comprising:
means for representing the received wireless signal as a spectral plot including a plurality of taps each at a corresponding time value;
means for identifying, in the spectral plot, one or more taps having a magnitude above a threshold value;
means for setting the weighting values for the one or more identified taps to unity; and
means for setting the weighting values for all other taps to zero.

24. The wireless device of claim 22, further comprising:
means for representing the received wireless signal as a spectral plot including a plurality of taps each at a corresponding time value;
means for identifying, in the spectral plot, the tap having the largest magnitude;
means for setting the weighting values for the identified tap and at least one adjacent tap to unity; and
means for setting the weighting values for all other taps to zero.

25. The wireless device of claim 22, wherein the phase information of the one or more identified weighted signal components is determined by applying a parametric algorithm to the plurality of weighted signal components.

26. The wireless device of claim 25, further comprising:
means for generating a plurality of phase estimates in response to the application of the parametric algorithm to the plurality of weighted signal components; and
means for selecting the one of the plurality of phase estimates associated with the first arrival path.

* * * * *